United States Patent
Gopal et al.

(10) Patent No.: US 9,474,002 B2
(45) Date of Patent: Oct. 18, 2016

(54) PRIORITY-BASED CELL RESELECTION

(71) Applicant: QUALCOMM Incorporated, San Diego, CA (US)

(72) Inventors: Thawatt Gopal, San Diego, CA (US); Tom Chin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/616,600

(22) Filed: Feb. 6, 2015

(65) Prior Publication Data

US 2016/0234746 A1 Aug. 11, 2016

(51) Int. Cl.
H04W 36/00 (2009.01)
H04W 36/26 (2009.01)
H04W 72/10 (2009.01)

(52) U.S. Cl.
CPC ............ *H04W 36/26* (2013.01); *H04W 72/10* (2013.01)

(58) Field of Classification Search
CPC ... H04W 48/20; H04W 16/14; H04W 36/04; H04W 36/12; H04W 36/16; H04W 36/22; H04W 52/0245; H04W 72/02; H04W 48/06; H04W 52/0235; H04W 60/00; H04W 72/085
USPC ........................................................ 455/436
See application file for complete search history.

(56) References Cited

U.S. PATENT DOCUMENTS

| | | | |
|---|---|---|---|
| 7,529,560 B2 | 5/2009 | Nielsen et al. | |
| 8,412,197 B2 | 4/2013 | Roberts et al. | |
| 2008/0268843 A1* | 10/2008 | Ore | H04W 36/0061 455/435.3 |
| 2010/0273485 A1 | 10/2010 | Huang et al. | |
| 2011/0034169 A1* | 2/2011 | Roberts | H04W 48/18 455/435.3 |
| 2012/0322447 A1 | 12/2012 | Ramachandran et al. | |
| 2013/0053036 A1* | 2/2013 | Gong | H04W 48/16 455/436 |
| 2013/0303173 A1* | 11/2013 | Hole | H04W 36/36 455/437 |
| 2014/0378140 A1 | 12/2014 | Gopal et al. | |

OTHER PUBLICATIONS

Nokia Siemens Networks: "Transmission of Dedicated Priorities in GERAN," 3GPP TSG GERAN2#40bis, G2-090067, Agenda Item 5.3.3, Jan. 13-16, 2009, 6 pages.
International Search Report and Written Opinion—PCT/US2016/012488—ISA/EPO—Mar. 15, 2016.

* cited by examiner

*Primary Examiner* — Kwasi Karikari
(74) *Attorney, Agent, or Firm* — Seyfarth Shaw LLP

(57) ABSTRACT

A user equipment (UE) enables reselection by supplementing dedicated priority information received from a network with proprietary priority-based reselection parameters stored in a UE memory. The reselection is performed when a currently camped-on cell does not broadcast priority-based reselection parameters. The proprietary priority-based reselection parameters include threshold parameters such as high priority thresholds, low priority thresholds, signal strength thresholds and related reselection timers.

24 Claims, 8 Drawing Sheets

US 9,474,002 B2

PRIORITY-BASED CELL RESELECTION

BACKGROUND

1. Field

Aspects of the present disclosure relate generally to wireless communication networks, and more particularly, to performing priority-based reselections with valid dedicated priority information sent by a network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes performing cell reselection based at least in part on dedicated priority information received from a network and stored proprietary priority-based reselection threshold parameters stored in a UE memory when a currently camped-on cell does not broadcast priority-based reselection parameters.

Another aspect discloses an apparatus including means for performing cell reselection based at least in part on dedicated priority information received from a network and stored proprietary priority-based reselection threshold parameters stored in a UE memory when a currently camped-on cell does not broadcast priority-based reselection parameters.

Another aspect discloses wireless communication having a memory and at least one processor coupled to the memory. The processor(s) is configured to perform cell reselection based at least in part on dedicated priority information received from a network and stored proprietary priority-based reselection threshold parameters stored in a UE memory when a currently camped-on cell does not broadcast priority-based reselection parameters.

In another aspect, a computer program product for wireless communications in a wireless network having a non-transitory computer-readable medium is disclosed. The computer-readable medium has non-transitory program code recorded thereon which, when executed by the processor(s), causes the processor(s) to perform operations of performing cell reselection based at least in part on dedicated priority information received from a network and stored proprietary priority-based reselection threshold parameters stored in a UE memory when a currently camped-on cell does not broadcast priority-based reselection parameters.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
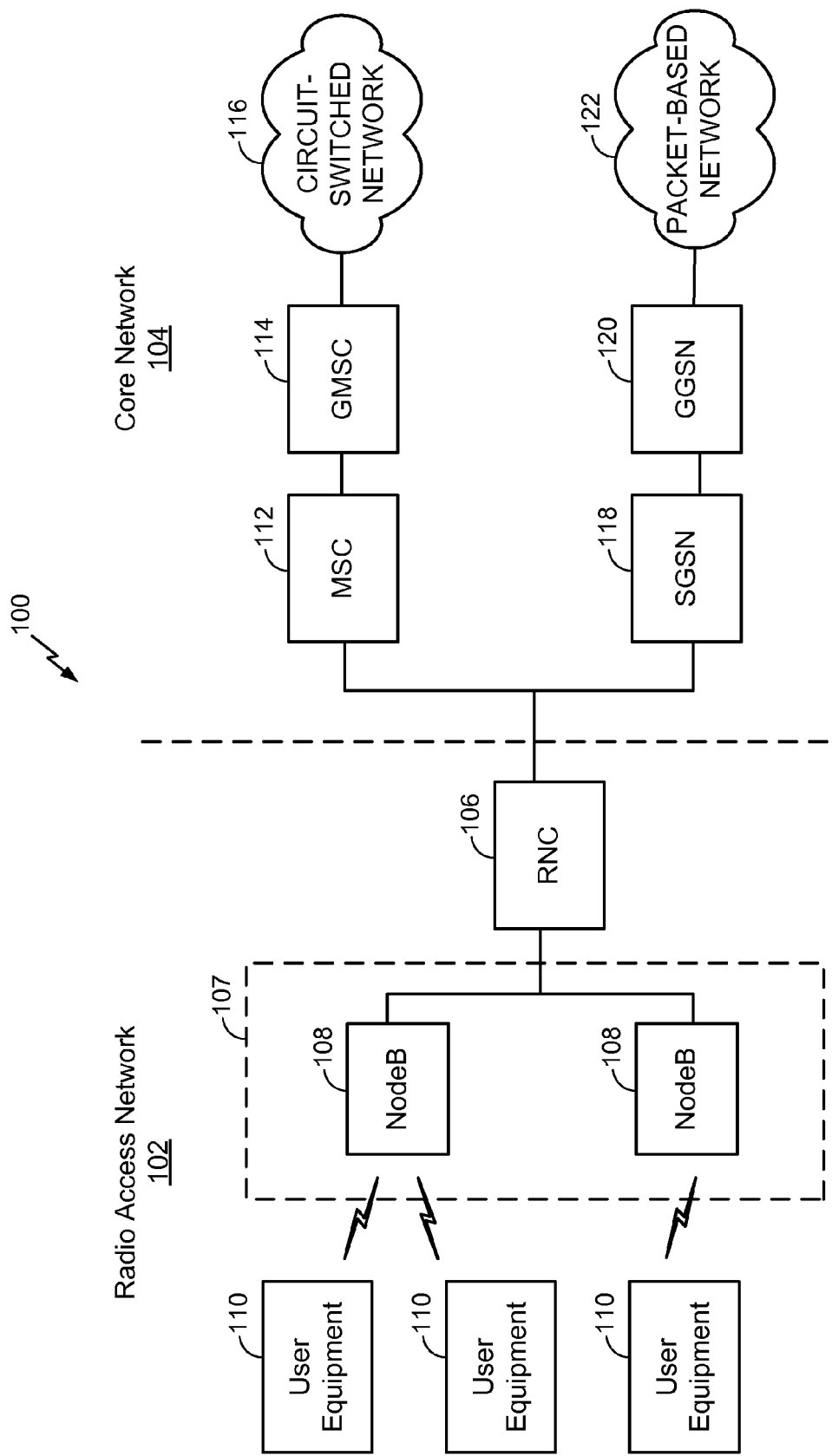
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
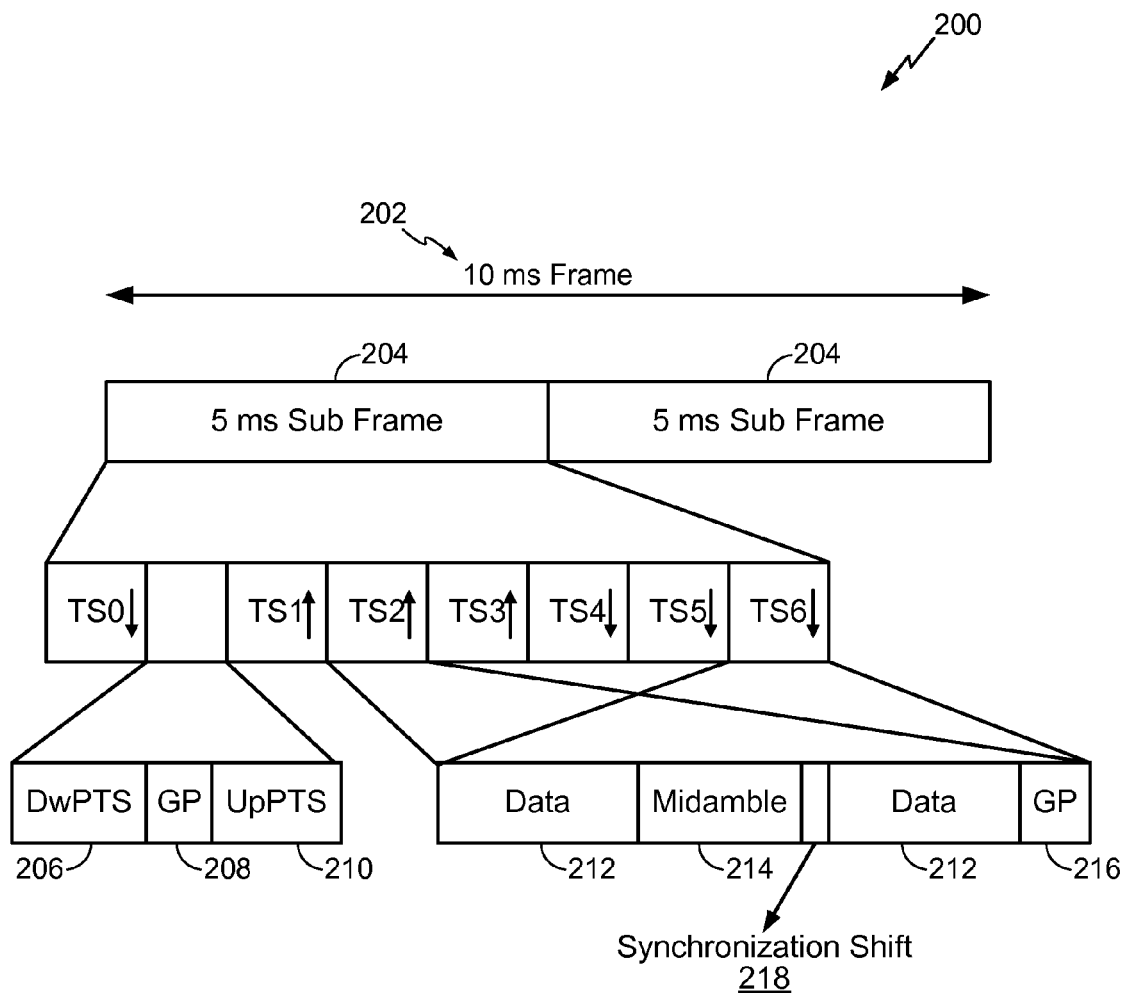
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including synchronization shift (SS) bits 218. Synchronization shift bits 218 only appear in the second part of the data portion. The synchronization shift bits 218 immediately following the midamble can indicate three cases: decrease shift, increase shift, or do nothing in the upload transmit timing. The positions of the synchronization shift bits 218 are not generally used during uplink communications.

Figure 3:
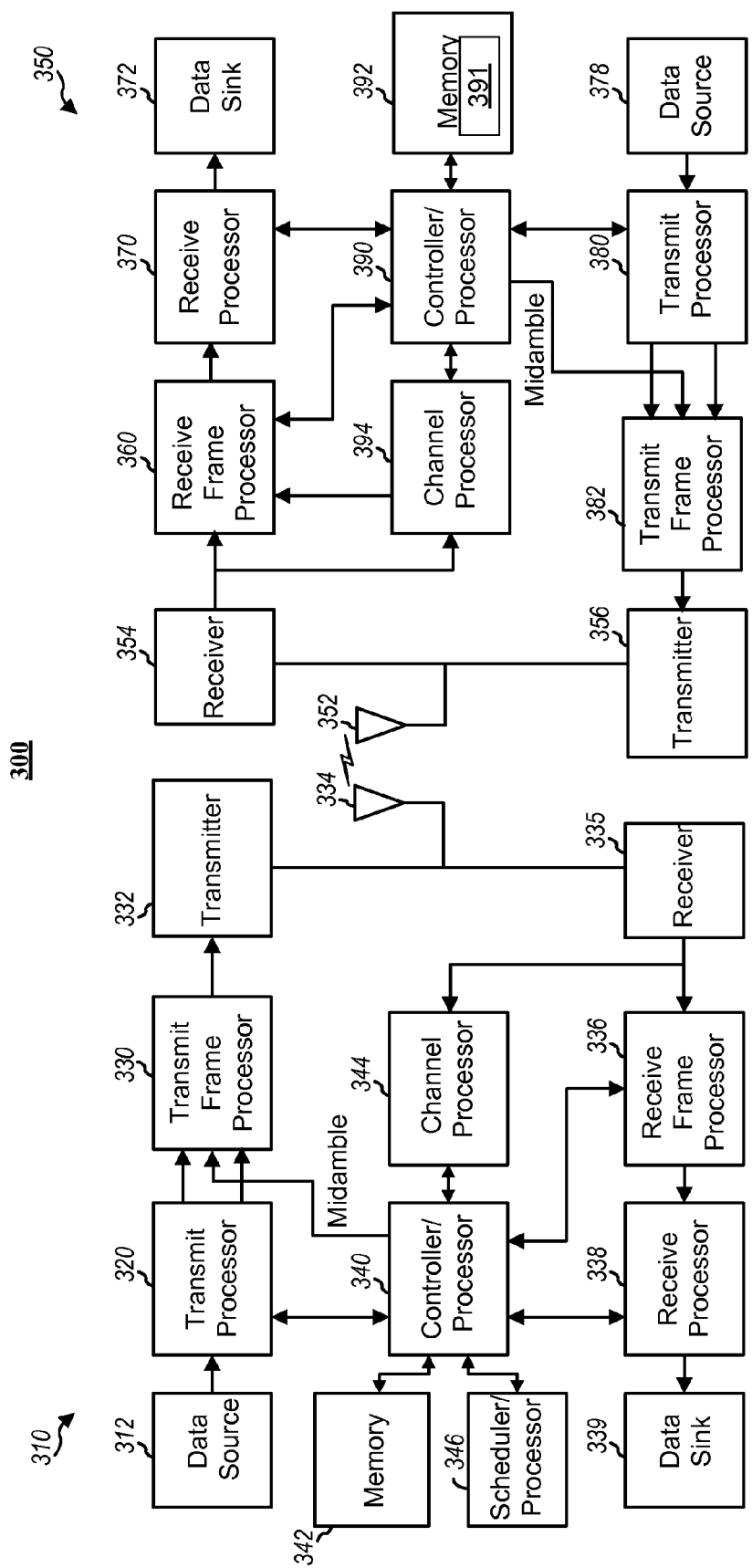
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames. Additionally, a scheduler/ processor 346 at the node B 310 may be used to allocate resources to the UEs and schedule downlink and/or uplink transmissions for the UEs.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer-readable media of memory may store data and software for the UE 350. For example, the memory 392 of the UE 350 may store a cell reselection module 391 which, when executed by the controller/processor 390, configures the UE 350 for performing cell reselection.

Figure 4:
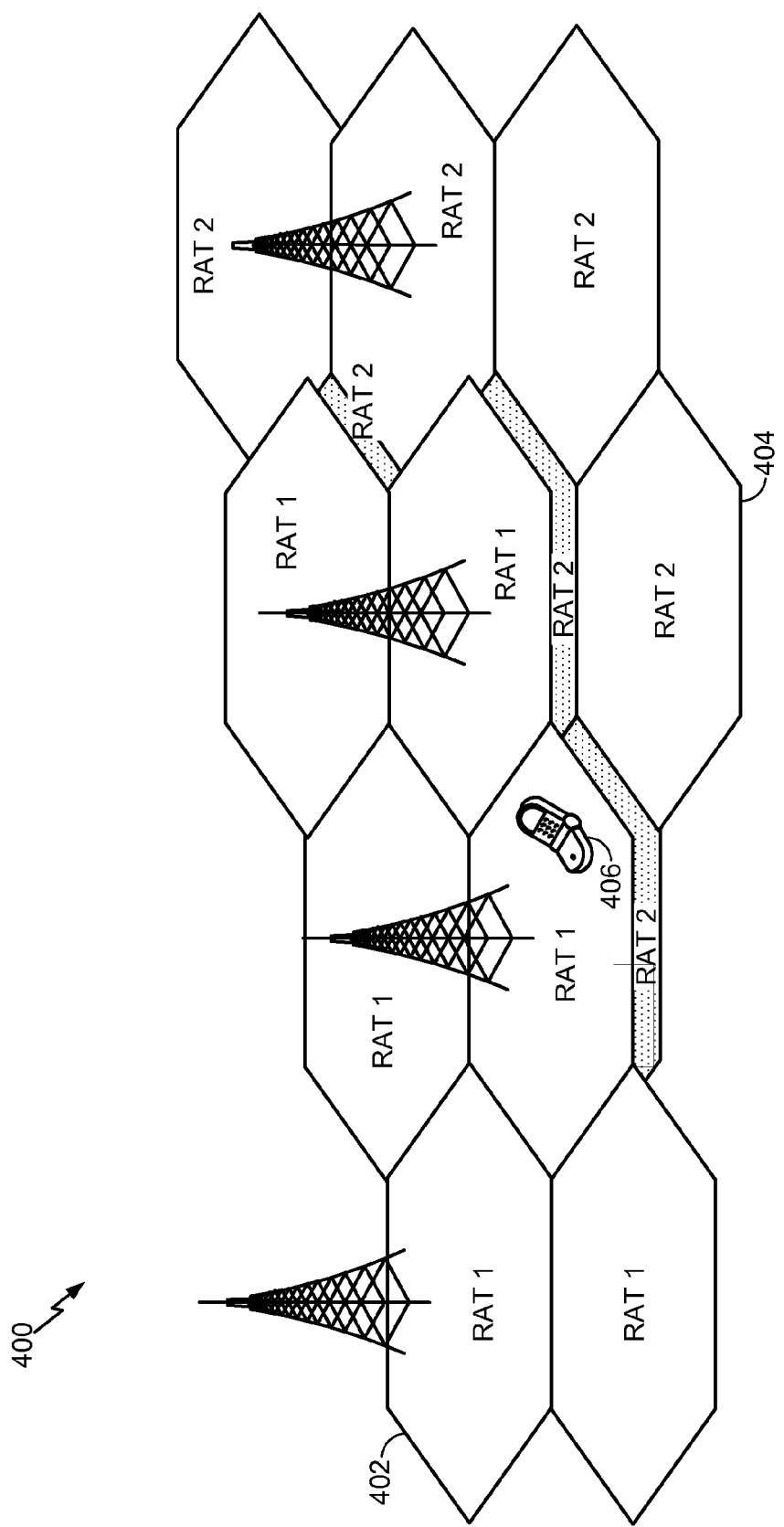
FIG. 4 illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4 illustrates coverage of an established network utilizing a first type of radio access technology (RAT-1), and a second type of RAT. The RATs may be any type of technology, such as, but not limited to GSM, LTE, TD-SCDMA and high speed data networks.

The geographical area 400 may include RAT-1 cells 402 and RAT-2 cells 404. In one example, the RAT-1 cells are LTE cells and the RAT-2 cells are TD-SCDMA cells. However, those skilled in the art will appreciate that other types of radio access technologies may be utilized within the cells. A user equipment (UE) 406 may move from one cell, such as a RAT-1 cell 404, to another cell, such as a RAT-2 cell 402. The movement of the UE 406 may specify a handover or a cell reselection.

The handover or cell reselection may be performed when the UE moves from a coverage area of a first RAT to the coverage area of a second RAT, or vice versa. A handover or cell reselection may also be performed when there is a coverage hole or lack of coverage in one network or when there is traffic balancing between a first RAT and the second RAT networks. As part of that handover or cell reselection process, while in a connected mode with a first system (LTE) a UE may be specified to perform a measurement of a neighboring cell (TD-SCDMA). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The UE may send a serving cell a measurement report indicating results of the IRAT measurement performed by the UE. The serving cell may then trigger a handover of the UE to a new cell in the other RAT based on the measurement report. The measurement may include a serving cell signal strength, such as a received signal code power (RSCP) for a pilot channel (e.g., primary common control physical channel (PCCPCH)). The signal strength is compared to a serving system threshold. The serving system threshold can be indicated to the UE through dedicated radio resource control (RRC) signaling from the network. The measurement may also include a neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

Cell Reselection

For absolute priority-based cell reselections, reselection information (such as frequencies and parameters) is sent to the UE over the broadcast channel via system information messages. For example, in a TD-SCDMA to LTE IRAT-based cell reselection, the reselection information (e.g., parameters, target cell information, and/or frequencies) is broadcast in the system information block (SIB) 19. In a GSM to LTE IRAT-based cell reselection, the information (i.e., reselection frequency and parameters) is broadcast in the system information 2-quarter (SI-2qtr). In GSM to TD-SCDMA IRAT-based cell reselection, the information (i.e., reselection frequency and parameters) is broadcast in both the system information 2-quarter (SI-2qtr) and the system information 2-ter (SI-2ter).

Additionally, for the reselection procedures, the UE utilizes priority information stored at the UE. The use of dedicated priority information is enabled when the UE sends a unicast message to the UE while the UE is in the connected mode. In TD-SCDMA and WCDMA, the UE receives the dedicated priority information via a radio resource control (RRC) UTRAN Mobility Information (UMI) message. In LTE, the UE receives the information via the RRC Connection Release message. The dedicated priority information contains information related to target cell frequency(ies), and priority, as well as the validity timer associated with the dedicated priority information.

In one example of an absolute priority-based reselection, the UE receives dedicated priority information while on the TD-SCDMA network via a RRC UMI message. After the UE transitions to Idle/DRX (discontinuous reception) mode, the UE receives the priority-based reselection thresholds from a SIB-19 system information message sent over a broadcast channel (BCH).

In another example, the UE performs reselection(s) to another radio access technology (RAT) with a valid dedicated priority timer running. The UE utilizes the dedicated priority information when the cell on which the UE is camped has corresponding priority-based reselection thresholds sent over the corresponding broadcast channel. When the dedicated priority information timer is valid, the UE utilizes the dedicated priority information (e.g., frequency, priority, etc.) and obtains the priority-based reselection thresholds from the system information message (e.g., SIB-19 for UTRAN) to enable priority-based reselections using the dedicated priority information.

However, some deployed networks are not mature during initial deployment stages because some portions of the network do not support the priority-based reselection parameters sent over the broadcast channel while other portions of the network do support the dedicated priority information sent to UE via a unicast message (e.g., when different portions of the network are associated with different base station vendors). When the UE moves to a part of the network with valid dedicated priority information but no valid priority reselection thresholds from the broadcast channel System Information message (e.g., SIB-19 in UTRAN), then the UE is unable to make use of the dedicated priority information message to perform priority-based reselections.

Figure 5:
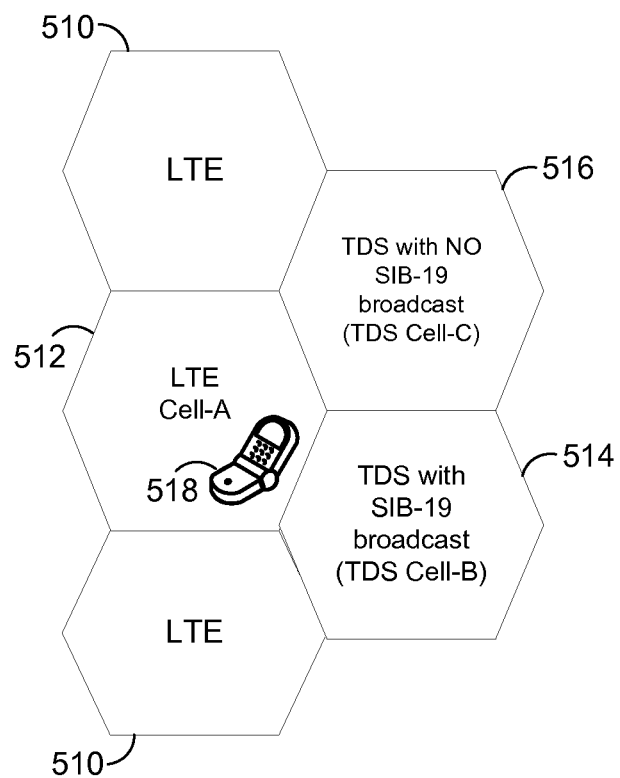
FIG. 5 illustrates a network coverages in a multiple RAT wireless network.

FIG. 5 illustrates coverages areas in a multiple RAT wireless network having LTE cells 510, 512 and TD-SCDMA cells 514, 516. The TD-SCDMA cell 514 is configured to broadcast reselection thresholds from SIB-19. The TD-SCDMA cell 516 does not broadcast SIB-19, and therefore no reselection thresholds are broadcast. If the UE 518 moves to the TD-SCDMA cell 514, and if the dedicated priority information timer remains valid, the UE 518 is able to perform priority-based reselections using the dedicated priority information it received while it was in connected mode in LTE Cell-A and the reselection thresholds broadcast via SIB-19 in TD-SCDMA Cell-B. However, if the UE 518 moves to the TD-SCDMA cell 516, and if the dedicated priority information timer is still valid, the UE 518 is NOT able to perform priority-based reselections using the dedicated priority information because certain key information (e.g., reselection thresholds) is not available from the SIB-19 information.

Aspects of the present disclosure are directed to enabling reselection by supplementing the dedicated priority information received from a network with stored proprietary priority-based reselection parameters stored in a UE memory. In particular, the proprietary priority-based reselection parameters include threshold parameters such as high priority thresholds, low priority thresholds, signal strength thresholds and related reselection timers.

In one option, the UE is pre-programmed with proprietary priority-based reselection parameters from the factory. Alternately, in another option, when a UE visits a cell-A (which has network broadcasted priority based reselection parameters), the UE caches respective parameters from cell-A to use when the UE visits a cell-B which does not have network broadcasted priority based reselection parameters. When the UE powers-up and goes directly to cell-B (i.e., there is no history of previously visited cells which broadcasted priority based reselection parameters), then the UE would instead use the factory pre-programmed priority-based reselection parameters.

Additionally, in another aspect, the UE determines whether to use the stored proprietary priority-based reselection threshold parameters based on matching public land mobile network identifications (PLMN IDs). In particular, the UE determines whether the PLMN ID of the cell upon which it is currently camped is included in a PLMN ID listing. The listing, in particular, includes a list of PLMN IDs associated with operators wanting to make use of the proprietary priority-based reselection threshold parameters. The UE stores a list of PLMN IDs associated with such operators.

The locally programmed priority reselection parameters may be used when the UE did not visit a cell which broadcasted the priority-based reselection parameters. This includes the scenario where 3G cells (e.g., TDSCDMA or WCDMA) in a large geographical area have not been upgraded to broadcast the priority-based reselection parameters, but the 4G cells were sending dedicated priority information to the UE when it was on the 4G cell (e.g., LTE). In one example, the UE determines whether cells it visited in the past broadcast priority-based cell reselection parameters, and if so, the UE caches the broadcast information to use in the future. Additionally, if the UE determines the cells did not broadcast priority-based cell reselection parameters, the UE retrieves, from its local memory, a locally programmed set of priority-based cell reselection parameters to enable priority based reselection using combination of dedicated priority information and locally programmed priority-based reselection parameters. In this example, the cell reselection utilizes dedicated priority information from a network and proprietary priority-based reselection threshold parameters pre-programmed and stored in a local UE memory.

Figure 6:
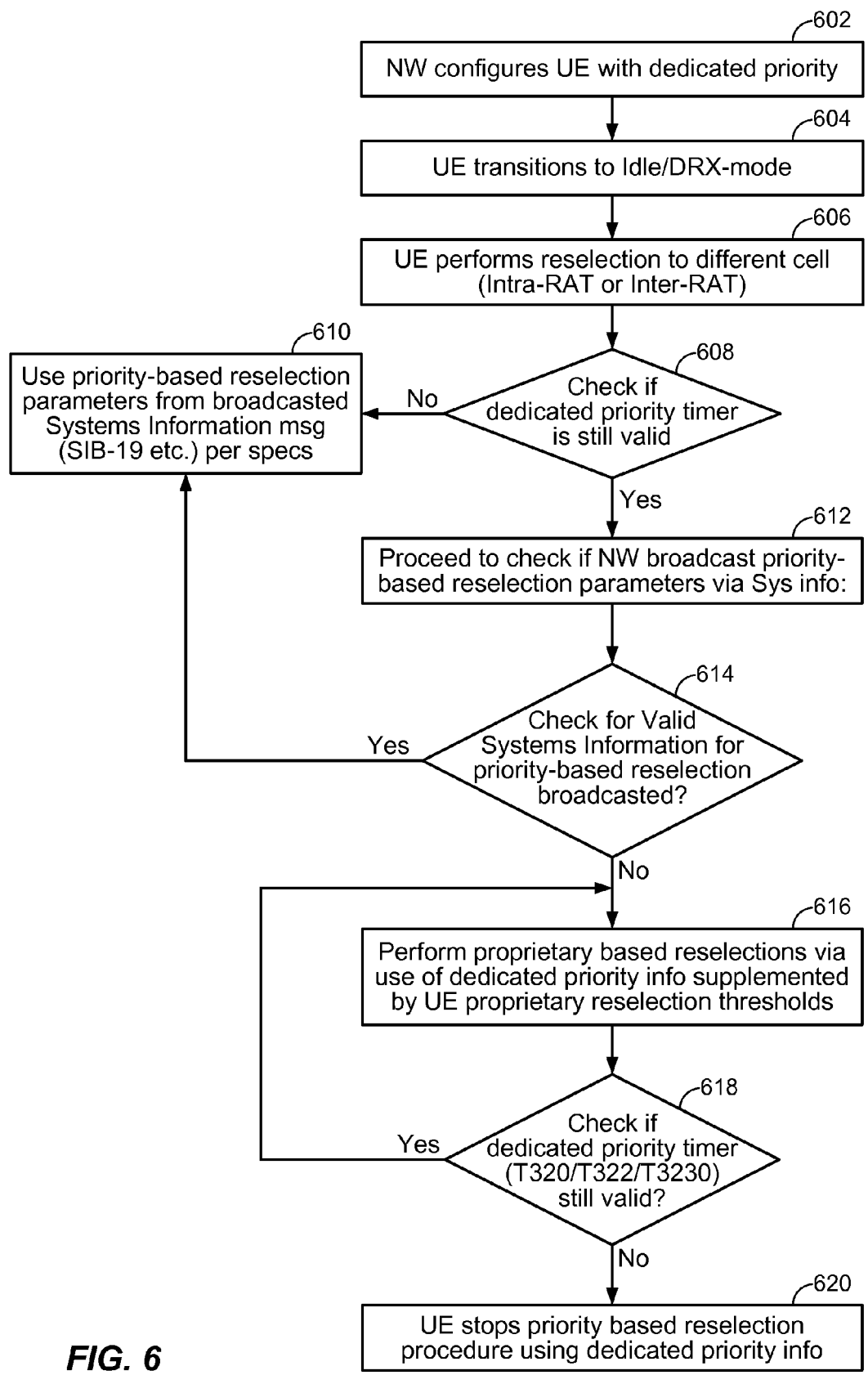
FIG. 6 is a flow diagram illustrating cell reselection according to one aspect of the present disclosure.

FIG. 6 is an example flow chart illustrating this process. In block 602, the network configures the UE with dedicated priority information. Examples of dedicated priority information include, but are not limited to, frequency information, priority information and the validity timer associated with the dedicated priority information. Next, in block 604, the UE transitions to idle/DRX mode. The UE performs reselection to a different cell, either intra-RAT or inter-RAT cell reselection in block 606. Next, in block 608, it is determined whether the dedicated priority timer is still valid (e.g., LTE/T320, UTRAN/T322, GSM/T3230). If the dedicated priority timer is no longer valid, then the process proceeds to block 610, and the priority-based reselection parameters from the broadcast system information message (e.g., SIB-19, etc.) are utilized.

Otherwise, if the dedicated priority timer is still valid, the process proceeds to block 612 where the process checks the network broadcast priority-based reselection parameters (e.g., UTRAN: SIB-19, SIB-5; LTE: SIB-6, SIB-b7; GSM: SI2qtr, SI2Ter). Next, the process proceeds to block 614 to determine whether valid system information was broadcast for the priority-based reselection. If it was, then the process proceeds back to block 610 and the priority-based reselection parameters broadcast from the systems information message are used. Otherwise, if valid systems information was not broadcast (at block 614), the process proceeds to block 616 to perform proprietary based reselection utilizing dedicated priority information supplemented by UE proprietary reselection thresholds.

In one example, the proprietary based reselection may be performed as follows. The UE retrieves reselection threshold parameters stored in a local memory of the UE. The reselection threshold parameters vary depending on the camped RAT. In particular, for reselection from LTE to another RAT (i.e., L2X), the UE retrieves reselection thresholds to enable L2X priority-based reselections using dedicated priority information and the UE local reselection thresholds. For reselection from TD-SCDMA to another RAT (i.e., T2X), the UE retrieves reselection thresholds to enable T2X priority-based reselection thresholds. Further, for reselection from GSM to another RAT (i.e., G2X), the UE retrieves reselection thresholds to enable G2X priority-based reselection thresholds. Additionally, for reselection from WCDMA to another RAT (i.e., W2X), the UE retrieves reselection thresholds to enable W2X priority-based reselection thresholds. After the UE retrieves the appropriate reselection threshold parameters stored in a UE local memory, the UE performs cell reselection using the dedicated priority information supplemented by the UE proprietary reselection thresholds. The stored thresholds are parameters for high priority, low priority, signal strengths and/or reselection timers.

At block 618, the process determines whether the dedicated priority timer is still valid. If the timer is no longer valid, the UE stops the priority-based reselection procedure (block 620). Otherwise, if the time is still valid, the process continues to enable the priority-based reselection procedure using the UE dedicated priority information and the UE proprietary priority-based reselection thresholds.

In one aspect, when the UE is camped on a RAT, the UE stores reselection thresholds corresponding to the serving cell RAT and the target cell RAT. The RATs may include, but are not limited to LTE, GSM, TD-SCDMA and WCDMA. The UE stores priority values for the serving and target frequency(ies).

Various reselection parameters may be stored in the UE's local database to enable the priority-based reselection, including serving and target cell parameters. For each serving cell, the UE reselection parameters may include the priority of a network and thresholds for triggering search and measurement procedures. For example, a threshold for priority-based search and measurement may be stored.

When the priority is known, the UE may use default values retrieved from a local memory.

The database also stores additional information for the neighbor cells, such as, but not limited to channel information, measurement bandwidth, detection parameters, priority information, and various threshold information, including signal strength thresholds. For LTE, the channel information may include the evolved absolute radio frequency channel number (EARFCN) and may be obtained from the database discussed above, which may be built upon the UE's prior discovered frequencies from background scans, redirection and handover.

The priority information indicates the priority of the neighbor RAT and/or frequency. The configured priority is generally associated with a frequency. The various threshold information may include a high reselection threshold and a low reselection threshold, for example, to be used when the neighbor cell is high priority or low priority, respectively. The database also stores a threshold for the minimum receive signal strength level that is sufficient for camping on the frequency associated with a particular intra or inter-RAT target. These parameters may be assigned default values.

Figure 7:
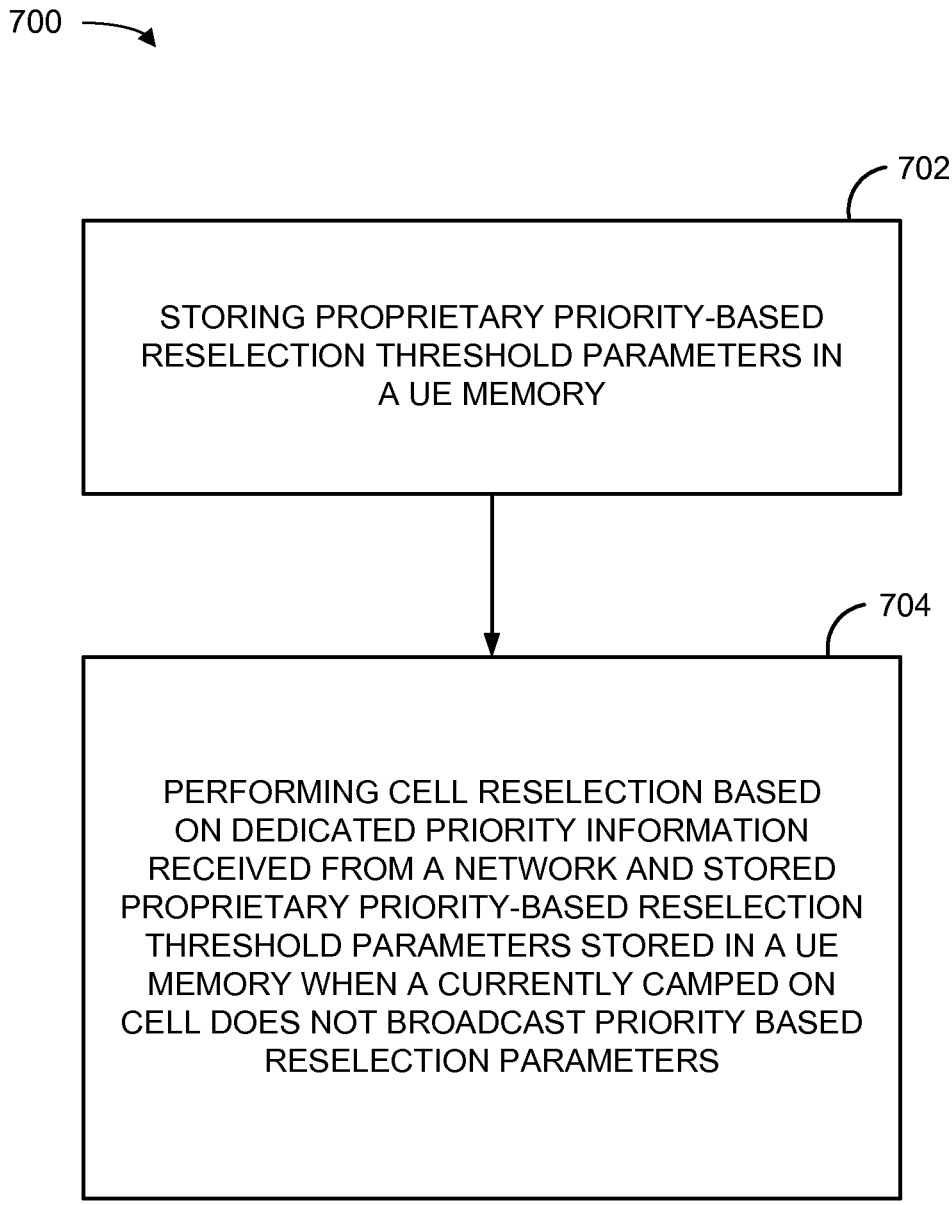
FIG. 7 is a block diagram illustrating a method for cell reselection to a neighbor cell according to one aspect of the present disclosure.

FIG. 7 shows a method of wireless communication 700 in a wireless network, according to one aspect of the disclosure. A UE stores proprietary priority-based reselection threshold parameters in a UE memory, as shown in block 702. The UE also performs cell reselection based on dedicated priority information received from a network and stored proprietary priority-based reselection threshold parameters stored in a UE memory when a currently camped-on cell does not broadcast priority-based reselection parameters, as shown in block 704.

Figure 8:
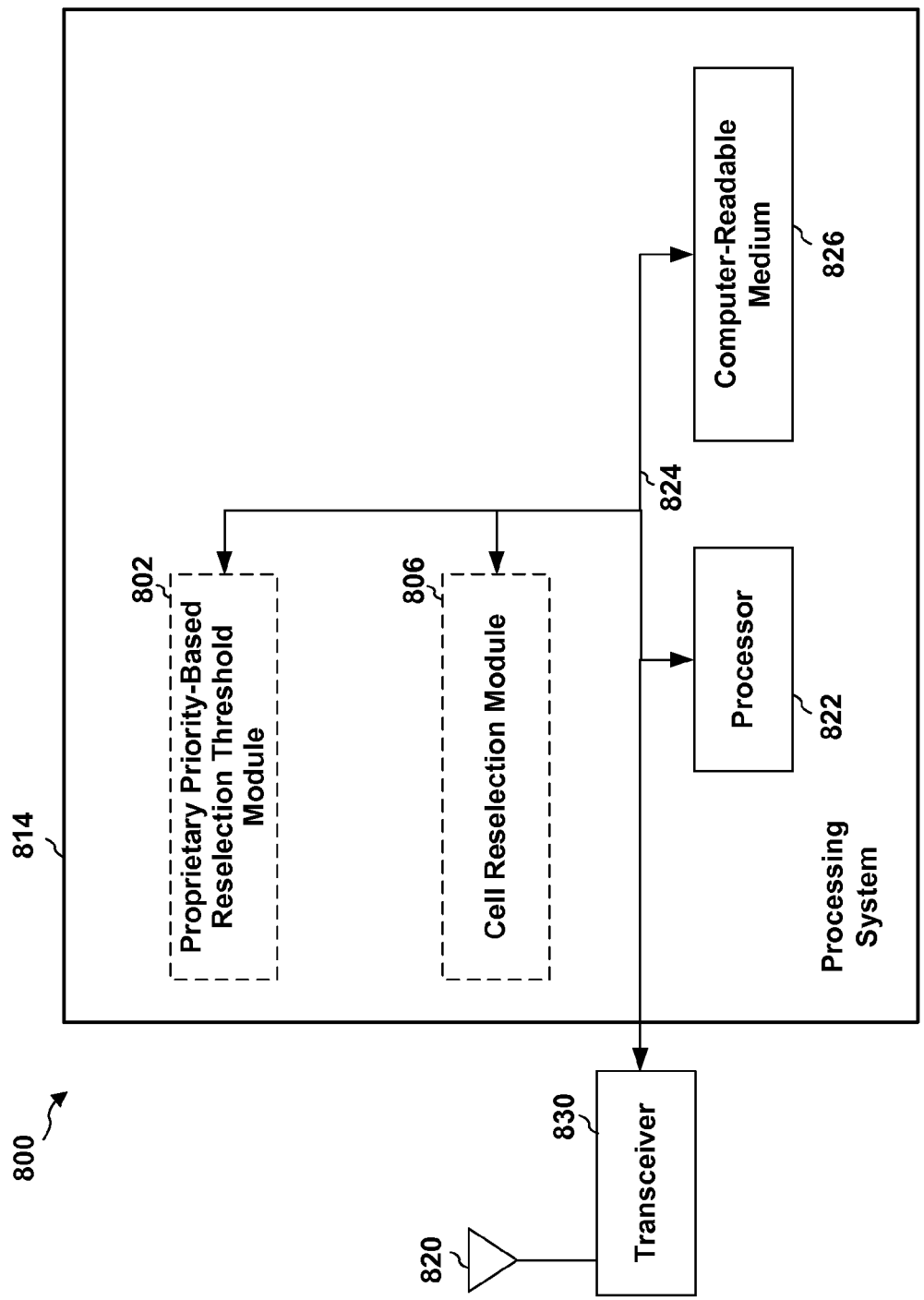
FIG. 8 is a diagram illustrating an example of a hardware implementation for an apparatus employing a processing system according to one aspect of the present disclosure.

FIG. 8 is a diagram illustrating an example of a hardware implementation for an apparatus 800 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including at least one processor and/or hardware modules, represented by the processor 822 the modules 802, 806, and the non-transitory computer-readable medium 826. The bus 824 may also link various other circuits such as timing sources, peripherals, voltage regulators, and power management circuits, which are well known in the art, and therefore, will not be described any further.

The apparatus includes a processing system 814 coupled to a transceiver 830. The transceiver 830 is coupled to one or more antennas 820. The transceiver 830 enables communicating with various other apparatus over a transmission medium. The processing system 814 includes a processor 822 coupled to a non-transitory computer-readable medium 826. The processor 822 is responsible for general processing, including the execution of software stored on the computer-readable medium 826. The software, when executed by the processor 822, causes the processing system 814 to perform the various functions described for any particular apparatus. The computer-readable medium 826 may also be used for storing data that is manipulated by the processor 822 when executing software.

The processing system 814 includes a proprietary priority-based reselection parameters threshold module 802 for storing proprietary priority-based reselection parameters thresholds. The processing system 814 includes a cell reselection module 806 for performing cell reselection. The modules may be software modules running in the processor 822, resident/stored in the computer-readable medium 826, one or more hardware modules coupled to the processor 822, or some combination thereof. The processing system 814 may be a component of the UE 350 and may include the memory 392, and/or the controller/processor 390.

In one configuration, an apparatus such as a UE is configured for wireless communication including means for storing. In one aspect, the storing means may be the memory 392, cell reselection module 391, proprietary priority-based reselection parameters threshold module 802, and/or the processing system 814 configured to perform the storing. The UE is also configured to include means for performing. In one aspect, the performing means may be the antennas 352, the receiver 354, the channel processor 394, the receive frame processor 360, the receive processor 370, the transmitter 356, the transmit frame processor 382, the transmit processor 380, the controller/processor 390, the memory 392, reselection module 391, cell reselection module 806, and/or the processing system 814 configured to perform the performing means. In one configuration, the means functions correspond to the aforementioned structures. In another aspect, the aforementioned means may be a module or any apparatus configured to perform the functions recited by the aforementioned means.

Several aspects of a telecommunications system has been presented with reference to TD-SCDMA, W-CDMA, GSM and LTE. As those skilled in the art will readily appreciate, various aspects described throughout this disclosure may be extended to other telecommunication systems, network architectures and communication standards. By way of example, various aspects may be extended to other UMTS systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

It is also to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining whether to use stored proprietary priority-based reselection threshold parameters based at least in cart on whether a public land mobile network identification (PLMN ID) of a currently camped-on cell matches an ID on a PLMN ID list associated with operators intending to use the proprietary priority-based reselection threshold parameters; and
   performing cell reselection based at least in part on dedicated priority information received from a network and the stored proprietary priority-based reselection threshold parameters stored in a UE memory when the currently camped-on cell does not broadcast priority-based reselection parameters.

2. The method of claim 1, in which the proprietary priority-based reselection threshold parameters are based at least in part on broadcast priority-based cell reselection parameters received from a previously camped-on cell.

3. The method of claim 1, which the proprietary priority-based reselection threshold parameters include a serving cell network priority and a serving cell reselection threshold.

4. The method of claim 1, in which the proprietary-based reselection threshold parameters include at least one of a neighbor cell network priority, neighbor cell reselection threshold and a neighbor cell measurement parameter.

5. The method of claim 1, comprising:
   determining, prior to the cell reselection, a cell previously visited by a UE broadcast priority-based cell reselection threshold parameters; and
   storing the broadcast priority-based cell reselection threshold parameters.

6. The method of claim 1, comprising, prior to performing:
   determining, prior to the cell reselection, a cell previously visited by a UE did not broadcast priority-based cell reselection parameters; and
   retrieving, from a local memory of a UE, a locally programmed set of priority-based cell reselection threshold parameters for performing cell reselection.

7. An apparatus for wireless communication, comprising:
   means for storing proprietary priority-based reselection threshold parameters in a UE memory;
   means for determining whether to use stored proprietary priority-based reselection threshold parameters based at least in part on whether a public land mobile network identification (PLMN ID) of a currently camped-on cell matches an ID on a PLMN ID list associated with operators intending to use the proprietary priority-based reselection threshold parameters; and
   means for performing cell reselection based at least in part on dedicated priority information received from a network and the stored proprietary priority-based reselection threshold parameters stored in the UE memory when the currently camped-on cell does not broadcast priority-based reselection parameters.

8. The apparatus of claim 7, in which the proprietary priority-based reselection threshold parameters are based at least in part on broadcast priority-based cell reselection parameters received from a previously camped-on cell.

9. The apparatus of claim 7, which the proprietary priority-based reselection threshold parameters include a serving cell network priority and a serving cell reselection threshold.

10. The apparatus of claim 7, in which the proprietary-based reselection threshold parameters include at least one of a neighbor cell network priority, neighbor cell reselection threshold and a neighbor cell measurement parameter.

11. The apparatus of claim 7, further comprising:
means for determining, prior to the cell reselection, a cell previously visited by a UE broadcast priority-based cell reselection threshold parameters; and
means for storing the broadcast priority-based cell reselection threshold parameters.

12. The apparatus of claim 7, comprising:
means for determining, prior to the cell reselection, a cell previously visited by a UE did not broadcast priority-based cell reselection parameters; and
means for retrieving, from a local memory of a UE, a locally programmed set of priority-based cell reselection threshold parameters for performing cell reselection.

13. An apparatus for wireless communication, comprising:
a memory; and
at least one processor coupled to the memory, the at least one processor being configured:
to determine whether to use stored proprietary priority-based reselection threshold parameters based at least in cart on whether a public land mobile network identification (PLMN ID) of a currently camped-on cell matches an ID on a PLMN ID list associated with operators intending to use the proprietary priority-based reselection threshold parameters; and
to perform cell reselection based at least in part on dedicated priority information received from a network and the stored proprietary priority-based reselection threshold parameters stored in a UE memory when the currently camped-on cell does not broadcast priority-based reselection parameters.

14. The apparatus of claim 13, in which the proprietary priority-based reselection threshold parameters are based at least in part on broadcast priority-based cell reselection parameters received from a previously camped-on cell.

15. The apparatus of claim 13, in which the proprietary priority-based reselection threshold parameters include a serving cell network priority and a serving cell reselection threshold.

16. The apparatus of claim 13, in which the proprietary-based reselection threshold parameters include at least one of a neighbor cell network priority, neighbor cell reselection threshold and a neighbor cell measurement parameter.

17. The apparatus of claim 13, in which the at least one processor is further configured:
to determine, prior to the cell reselection, a cell previously visited by a UE broadcast priority-based cell reselection threshold parameters; and
to store the broadcast priority-based cell reselection threshold parameters.

18. The apparatus of claim 13, in which the at least one processor is further configured to:

determine, prior to the cell reselection, a cell previously visited by a UE did not broadcast priority-based cell reselection parameters; and
to retrieve, from a local memory of a UE, a locally programmed set of priority-based cell reselection threshold parameters for performing cell reselection.

19. A non-transitory computer-readable medium having non-transitory program code recorded thereon for wireless communication, the program code comprising:
program code to determine whether to use stored proprietary priority-based reselection threshold parameters based at least in part on whether a public land mobile network identification (PLMN ID) of a currently camped-on cell matches an ID on a PLMN ID list associated with operators intending to use the proprietary priority-based reselection threshold parameters; and
program code to perform cell reselection based at least in part on dedicated priority information received from a network and the stored proprietary priority-based reselection threshold parameters stored in a UE memory when the currently camped-on cell does not broadcast priority-based reselection parameters.

20. The non-transitory computer-readable medium of claim 19, in which the proprietary priority-based reselection threshold parameters are based at least in part on broadcast priority-based cell reselection parameters received from a previously camped-on cell.

21. The non-transitory computer-readable medium of claim 19, which the proprietary priority-based reselection threshold parameters include a serving cell network priority and a serving cell reselection threshold.

22. The non-transitory computer-readable medium of claim 19, in which the proprietary-based reselection threshold parameters include at least one of a neighbor cell network priority, neighbor cell reselection threshold and a neighbor cell measurement parameter.

23. The non-transitory computer-readable medium of claim 19, further comprising:
program code to determine, prior to the cell reselection, a cell previously visited by a UE broadcast priority-based cell reselection threshold parameters; and
program code to store the broadcast priority-based cell reselection threshold parameters.

24. The non-transitory computer-readable medium of claim 19, further comprising:
program code to determine, prior to the cell reselection, a cell previously visited by a UE did not broadcast priority-based cell reselection parameters; and
program code to retrieve, from a local memory of a UE, a locally programmed set of priority-based cell reselection threshold parameters for performing cell reselection.

* * * * *